United States Patent
Rohit et al.

(10) Patent No.: US 7,418,540 B2
(45) Date of Patent: Aug. 26, 2008

(54) MEMORY CONTROLLER WITH COMMAND QUEUE LOOK-AHEAD

(75) Inventors: Natarajan Rohit, Sunnyvale, CA (US); Debra Bernstein, Sudbury, MA (US); Gilbert Wolrich, Framingham, MA (US); Chang-Ming Lin, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 10/834,597

(22) Filed: Apr. 28, 2004

(65) Prior Publication Data

US 2005/0246481 A1    Nov. 3, 2005

(51) Int. Cl.
G06F 12/06    (2006.01)
G06F 13/16    (2006.01)

(52) U.S. Cl. .............................. 711/5; 710/39; 711/169
(58) Field of Classification Search ........................ None
See application file for complete search history.

(56) References Cited

U.S. PATENT DOCUMENTS

| | | | |
|---|---|---|---|
| 5,903,916 A | 5/1999 | Pawlowski et al. | |
| 6,172,893 B1 * | 1/2001 | Ryan ........................... | 365/49 |
| 6,269,433 B1 | 7/2001 | Jones et al. | |
| 6,307,789 B1 | 10/2001 | Wolrich et al. | |
| 6,324,624 B1 | 11/2001 | Wolrich et al. | |
| 6,427,196 B1 | 7/2002 | Adiletta et al. | |
| 6,463,072 B1 | 10/2002 | Wolrich et al. | |
| 6,470,433 B1 | 10/2002 | Prouty et al. | |
| 6,530,001 B1 | 3/2003 | Lee | |
| 6,532,509 B1 | 3/2003 | Wolrich et al. | |
| 6,560,667 B1 | 5/2003 | Wolrich et al. | |
| 6,606,704 B1 | 8/2003 | Adiletta et al. | |
| 6,631,462 B1 | 10/2003 | Wolrich et al. | |
| 6,687,247 B1 * | 2/2004 | Wilford et al. ............... | 370/392 |
| 6,738,831 B2 | 5/2004 | Wolrich et al. | |
| 6,839,266 B1 | 1/2005 | Garrett, Jr. et al. | |
| 6,868,476 B2 | 3/2005 | Rosenbluth et al. | |
| 6,934,951 B2 | 8/2005 | Wilkinson, III et al. | |
| 6,941,438 B2 | 9/2005 | Wolrich et al. | |
| 2003/0115347 A1 | 6/2003 | Wolrich et al. | |
| 2004/0004968 A1 | 1/2004 | Lakshmanamurthy et al. | |
| 2004/0095948 A1 | 5/2004 | Lin | |
| 2004/0193777 A1 | 9/2004 | LaBerge | |
| 2005/0135367 A1 | 6/2005 | Chandra et al. | |

(Continued)

FOREIGN PATENT DOCUMENTS

WO    WO 02/33556 A    4/2002

OTHER PUBLICATIONS

Micron Technical Note: TN-49-02 Exploring the RLDRAM 11 Feature Set; 2004, 4 pages.

(Continued)

*Primary Examiner*—Gary J Portka
(74) *Attorney, Agent, or Firm*—Robert A. Greenberg

(57) ABSTRACT

In general, in one aspect, the disclosure describes accessing multiple memory access commands from a one of multiple memory access command queues associated with, respective, banks of a Random Access Memory (RAM) and selecting one of the commands based, at least in part, on the memory access operations identified by the commands and the memory access operation of a previously selected memory access commands.

16 Claims, 8 Drawing Sheets

U.S. PATENT DOCUMENTS

| | | |
|---|---|---|
| 2005/0144413 A1 | 6/2005 | Kuo et al. |
| 2005/0149725 A1 | 7/2005 | Sydir et al. |
| 2005/0198361 A1 | 9/2005 | Chandra et la. |
| 2005/0204111 A1 | 9/2005 | Natarajan |

OTHER PUBLICATIONS

Micron Technical Note: TN-46-05 General DDR SDRAM Functionality; 201; 11 pages.

PCT ISR dated Sep. 9, 2005.

Intel, Intel Technology Journal, The Next Gereration og Intel IXP Network Processors, vol. 06, Issue 03, Aug. 15, 2002, pp. 1-15.

Micron, RLDRAM II Memory, Low-Latency, High-Density, High-Bandwidth DRAM, Dec. 12, 2003, pp. 2.

Intel, Intel IXP1200 Network Processor Family, Hareware Reference Manual, Dec. 2001, pp. 1-272.

Pending U.S. Appl. No. 10/798,600, filed Mar. 10, 2004, inventor: Natarajan; Office Action dated Oct. 3, 2006.

PCT/US2005/012089 Int'l Preliminary Report on Patentability and Written Opinion dated Nov. 9, 2006. (pp. 7).

Pending U.S. Appl. No. 10/798,600, filed Mar. 10, 2004, inventor Natarajan.

\* cited by examiner

|  | Inputs |  | Output |
|---|---|---|---|
| 1st Command | 2nd Command | Address Overlap | |
| Any | None | N/A | 1st Command |
| Any | Any | Yes | 1st Command |
| Read | Read | No | 1st Command |
| Read | Write | No | if (prev == read) 1st Command else 2nd Command |
| Write | Write | No | 1st Command |
| Write | Read | No | if (prev==write) 2nd Command else 1st Command |

120 — (Any/None/N/A)
122 — (Any/Any/Yes)
124 — (Read/Read/No)
126 — (Read/Write/No)
128 — (Write/Write/No)
130 — (Write/Read/No)

FIG. 2

MEMORY CONTROLLER WITH COMMAND QUEUE LOOK-AHEAD

REFERENCE TO RELATED APPLICATIONS

This relates to co-pending U.S. patent application Ser. No. 10/798,600, entitled "Command Scheduling for Dual Data Rate Two (DDR2) Memory Devices", filed Mar. 10, 2004.

BACKGROUND

Many electronic devices store data using a memory known as Random Access Memory (RAM). A wide variety of RAM architectures have been developed. Generally, these architectures feature an address bus that identifies the memory address being accessed and a data bus that carries data being written to or read from the memory.

Some RAM architectures feature a bidirectional data bus that can change direction based on whether data is being read or written. Switching the direction of this bus can take a small but, nevertheless, significant amount of time.

To avoid a time penalty associated with switching bus direction, other RAM architectures feature multiple buses. For example, a memory may feature a read data bus to carry data retreived from memory and a separate write bus to carry data being written.

BRIEF DESCRIPTION OF THE DRAWINGS

FIG. 2 is a table illustrating memory controller operation.

DETAILED DESCRIPTION

Figure 1A:
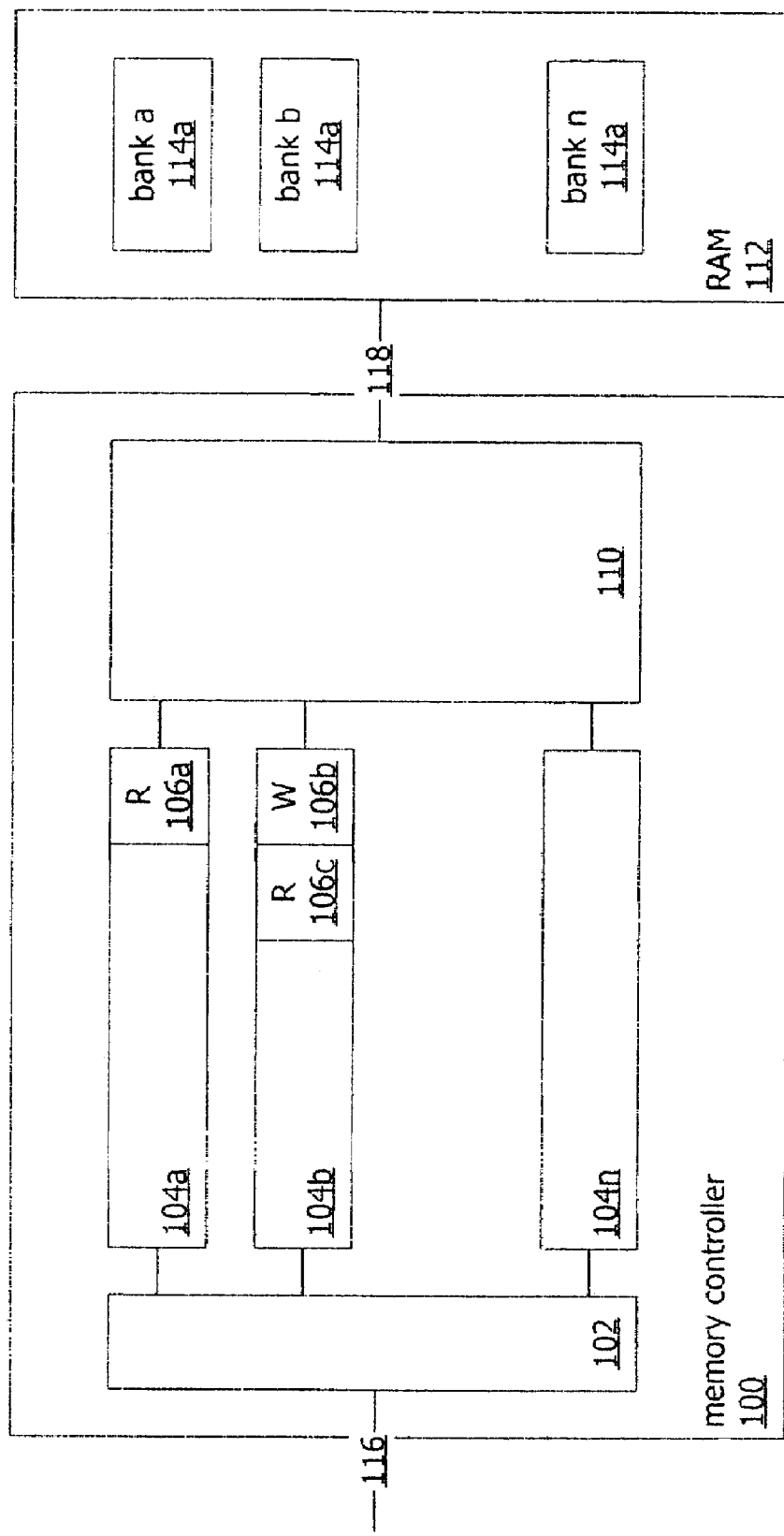
FIGS. 1A-1C illustrate operation of a memory controller.

FIG. 1A shows a memory controller 100 that receives memory access commands for a Random Access Memory (RAM) 112. These commands include read commands that specify a memory 112 address to read and write commands that specify both an address and data to be written.

Potentially, the controller 100 may receive more commands than the RAM 112 can respond to in a given period of time. Thus, the controller 100 features a set of queues 104a-104n that buffer received commands until they can be serviced by the RAM 112.

As shown, the RAM 112 divides storage among different internal memory banks 114a-114n. For each bank 114a-114n of RAM 112, the controller 100 maintains a separate queue 104a-104n. Upon receiving a command, controller 100 circuitry 102 adds the command to the end of the appropriate queue 104a-104n, for example, based on the command's address.

Figure 1B:
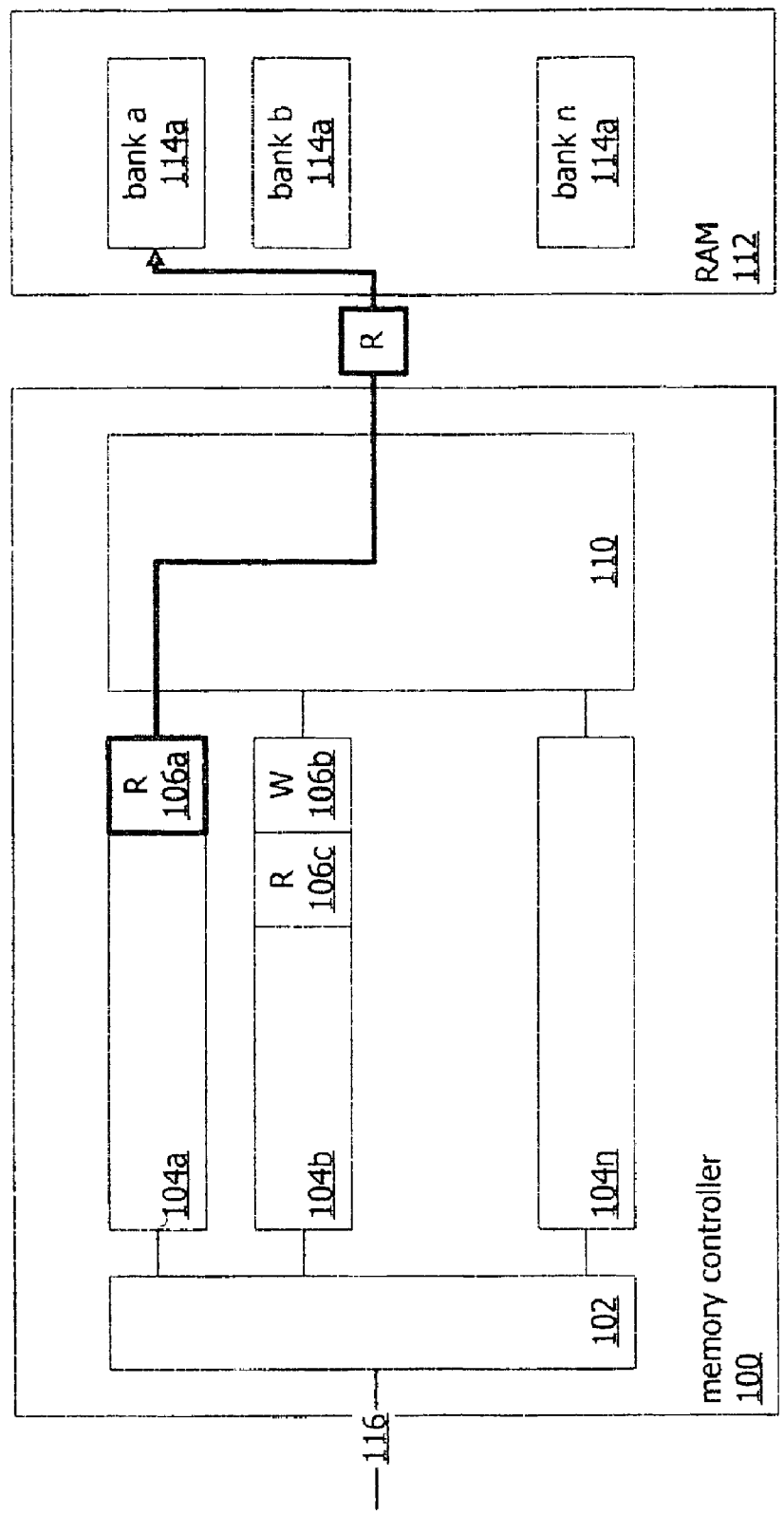

As shown, the controller 100 includes circuitry 110 that "drains" queues 114a-114n of commands and initiates corresponding operations in RAM 112. For example, as shown in FIG. 1B, circuitry 110 "pops" a read command 106a (labeled "R") from a queue 104a and initiates a corresponding read operation of RAM 112. In response, the RAM 112 can return read data (not shown) to the memory controller 100 which can, in turn, return the read data to whatever entity issued the read command.

The response time of the RAM 112 for a given operation depends both on the architecture of the RAM 112 and the sequence of operations performed. For example, a RAM 112 featuring a bidirectional bus (e.g., a Double Data Rate II (DDRII) Synchronous Dynamic Random Access Memory (SDRAM) memory chip or a Reduced Latency Dynamic Random Access Memory (RLDRAM) Common I/O (CIO) memory chip) may penalize a read operation that follows a write due to the time it takes to switch the direction of the data bus. Similarly, a RAM 112 featuring dual buses (e.g., a Reduced Latency Dynamic Random Access Memory (RLDRAM) Separate Input/Output (SIO) memory chip) may be more efficiently used by alternating read and write operations that take advantage of both the read and write buses.

Figure 1C:
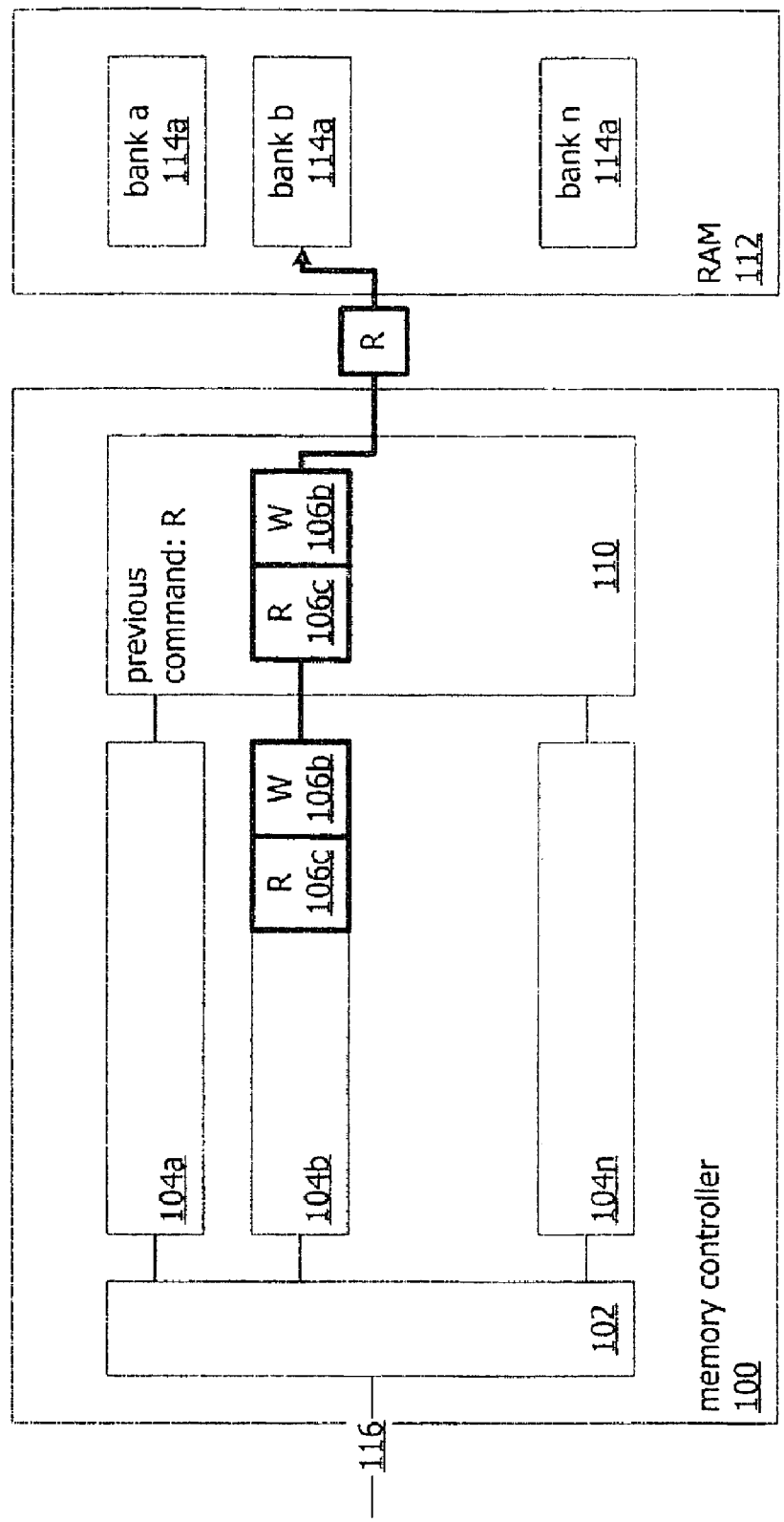

As shown in FIG. 1C, instead of strictly processing commands based on their order within a queue, controller 100 circuitry 110 can access the top two commands 106b-106c of a queue 104b and select a command that may better utilize RAM 112 capabilities. For example, as shown, if a previous RAM 112 operation was a read (106a in FIG. 1B) and the RAM 112 architecture penalizes a write after a read, the controller 110 can select read command 106c and initiate a corresponding memory 112 operation even though write command 106b was queued before read command 106c. By "looking" at multiple commands, the controller 100 increases the chances of finding a command that can improve memory 112 throughput. For some RAMs 112, the brief amount of time used by the controller 100 to select commands may be "hidden" within periods otherwise spent waiting for the RAM 112 (e.g., the minimum time between successive activates to the same bank).

Frequently, a memory controller 100 guarantees that read operations reflect previous write operations. For example, in FIG. 1C, if write command 106b was to overwrite the value "x" at a given address with the value "y" and the read command 106c was to read the same address, selecting command 106c ahead of previously queued command 106b would incorrectly result in command 106c reading a value of "x". To prevent this scenario, the controller 100 can compare the addresses of commands being considered for selection. For example, if commands 106b and 106c both specified the same address, the controller 100 could select command 106b based on queue order to preserve data integrity Potentially, commands may specify addresses that are different, but, nevertheless, result in access of overlapping portions of memory 112. For example, command 106b may write 8-bytes of data starting at address "1" while command 106c reads 8-bytes of data starting at address "5". Thus, both commands access bytes "5" through "8". To prevent out-of-order execution of such commands 106b-106c, the address comparison performed by the controller 100 may be based on a subset of address bits (e.g., the most significant N-bits) instead of a test for identically matching addresses.

The controller 100 illustrated in FIGS. 1A-1C is merely an example and a wide variety of variations are possible. For example, instead of selecting from the first two commands of a given queue 104a-104n, the controller 100 may select from the first N commands of the queue. Additionally, the sample controller 100 selected commands based on the type of access requested by the commands. However, the controller 100 may also perform selection based on other considerations, depending on RAM 112 architecture. Further, while FIGS. 1A-1C illustrated a strict one-to-one correspondence between queues 104a-104n and banks 114a, in other implementations, a given queue may buffer commands to more than one bank and a given bank may be fed by more than one queue.

FIG. 2 shows a table illustrating logic of a sample controller 100. The table identifies different command selections made by a controller of a memory that features a write-after-read and a read-after-write penalty. As shown, if a queue features a single command 120, the single command is selected. If the different commands affect overlapping addresses 122, the controller can select the earlier queued command.

As shown in the table, for a read following a read 124 or a write following a write 128, the controller 100 may select the earlier queued command. In the cases 126-130 where the controller 100 has different types of commands to select from, the controller 100 may select a command requesting the same access type as the previously selected command (e.g., the one most recently issued to memory or added to a schedule of memory commands to issue).

Again, the table shown is merely an example and other controllers may implement different logic. For example, for a memory 112 that penalizes write-after-write or read-after-read sequences, the controller 112 may instead select a command requesting a type of access that differs from the previously selected memory 112 operation. Additionally, instead of always performing an address comparison, the controller 100 may instead perform the comparison when necessary (e.g., a read following a write). Further, in some cases, the selection of commands may be arbitrary. For example, the table in FIG. 2 reflects a selection of an earlier received read command when a pair of read commands is evaluated 122. The order in which the memory 112 performs these reads does not impact the stored data. Thus, the second command could be selected instead of the first command without adverse impact.

Figure 3:
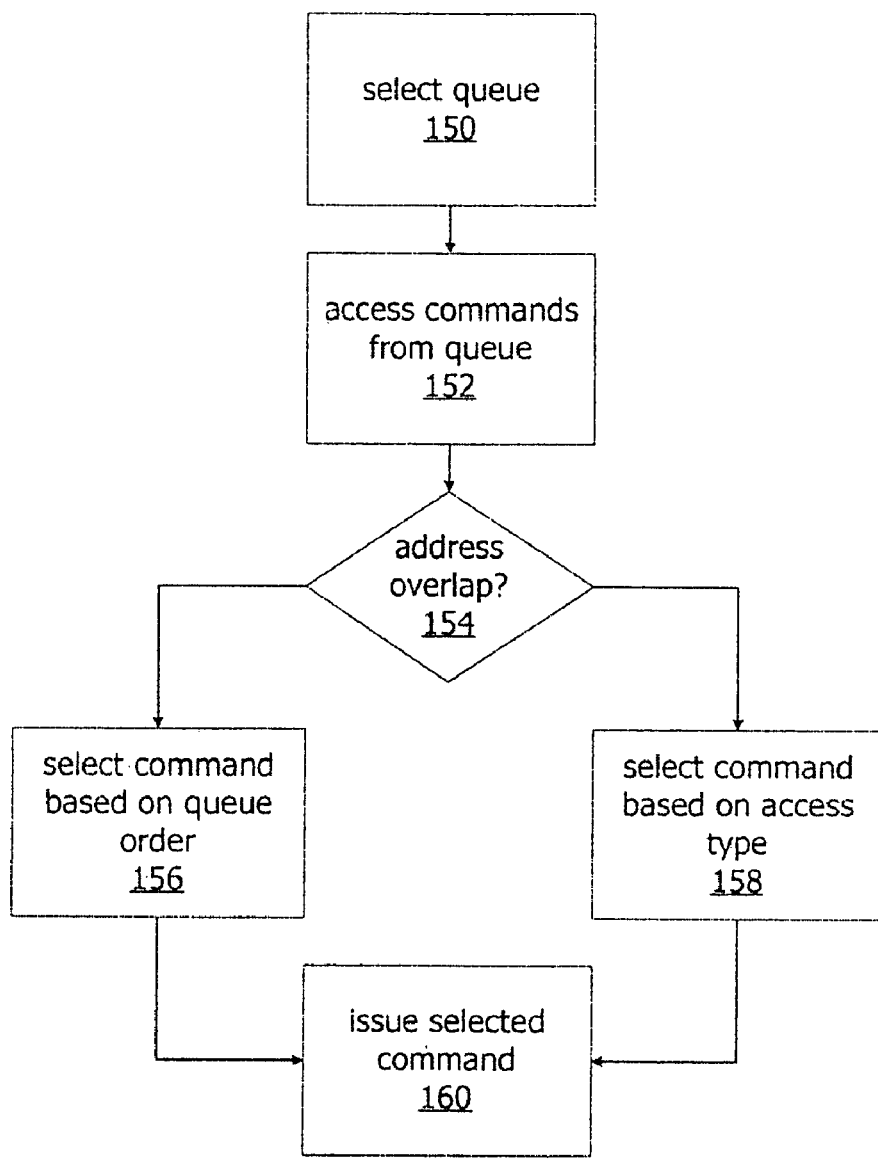
FIG. 3 is a flow-chart of memory controller operation.

FIG. 3 shows a sample flow-chart of controller 100 operation. As shown, the controller 100 selects 150 a queue to service. For example, the controller 100 may perform a round robin that services each queue in turn. Alternately, the controller 100 may implement some other servicing algorithm (e.g., based on the number of pending commands in the queues or using a priority scheme).

For the selected queue, the controller 100 accesses 152 multiple commands. If the commands access overlapping 154 addresses, the controller 100 can select 156 a command based on the queued order of the commands. Otherwise, the controller 100 can select 158 a command based on the operation specified by the command and a previously selected command. The controller 100 can then initiate 160 or schedule a corresponding memory operation for the selected command.

Figure 4:
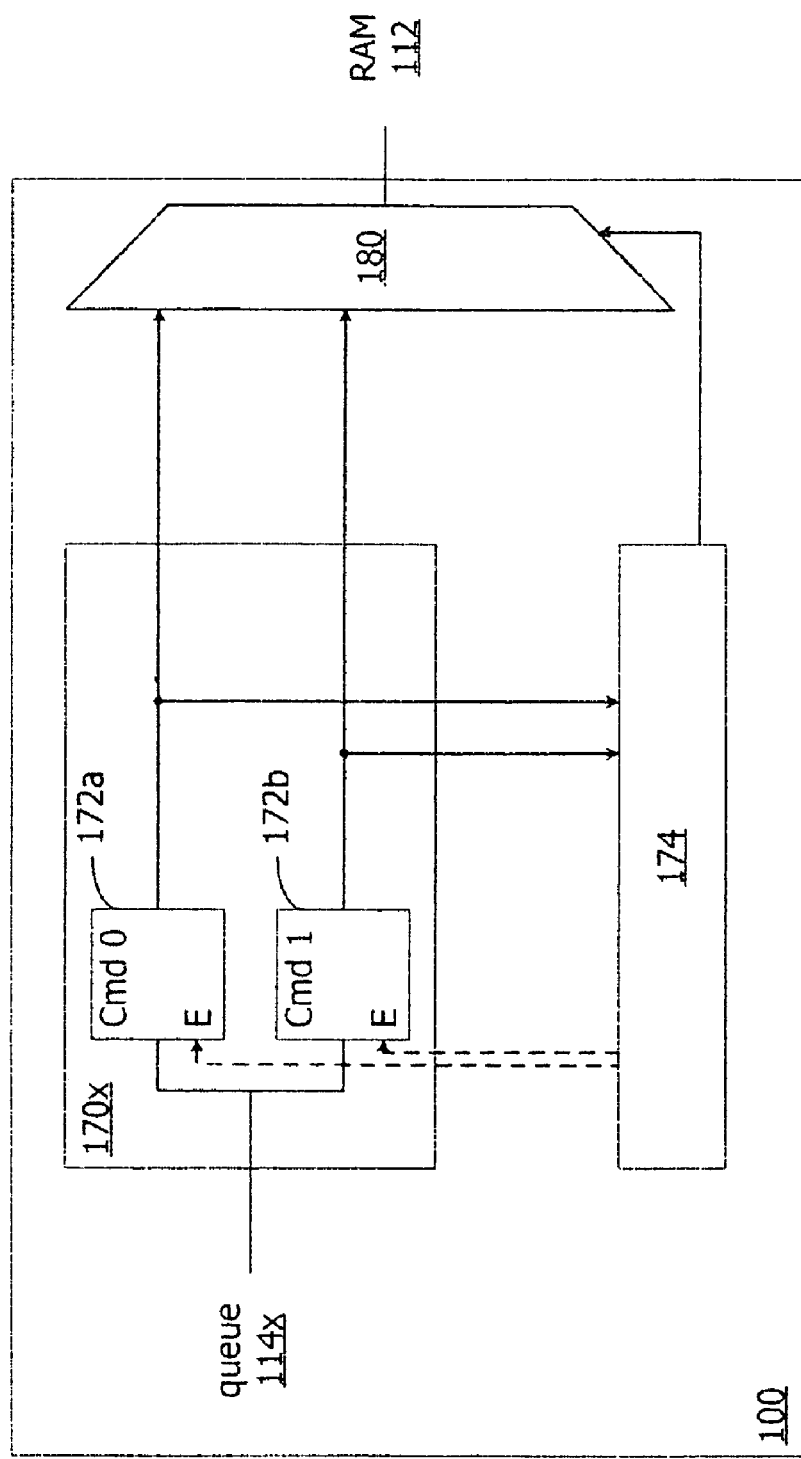
FIG. 4 is a diagram of a memory controller.

FIG. 4 depicts a schematic of a sample implementation of a controller 100. The schematic shown features a circuitry block 170x to buffer commands from a given queue 114x. Block 170x may be replicated for each queue serviced.

Queue 114x may be implemented in a variety of ways. For example, the queue 114x may be implemented in hardware using a data array and a head of queue register and end of queue register (not shown). The array locations pointed to by these registers may "wrap around" the data array as commands are queued and dequeued.

As shown, the block 170x features multiple flip-flops 172a-172b that can buffer 172a-172b commands popped from queue 114x. The flip-flop 172a-172b used to buffer a given command may be selected by circuitry 174. For example, if a command buffered by a given flip-flop selected in one selection round, that flip-flop may be deemed "available" and used to store a newly "popped" command in the next round. Thus, though the block buffers two commands, only one need be popped from the queue at a given time.

In addition to routing queue commands to available buffers 172a-172b, circuitry 174 is fed the buffered commands to perform command selection as described above (e.g., address comparison and/or command selection based on access type). To select a command, the circuitry 174 may select which input of a multiplexer 180 fed by the buffers 172 of this 170x and other blocks (not shown) is output to the memory 112. Alternately, instead of issuing a selected command after selection, the controller 100 may construct a schedule of commands to be issued from the different queues over time.

Figure 5:
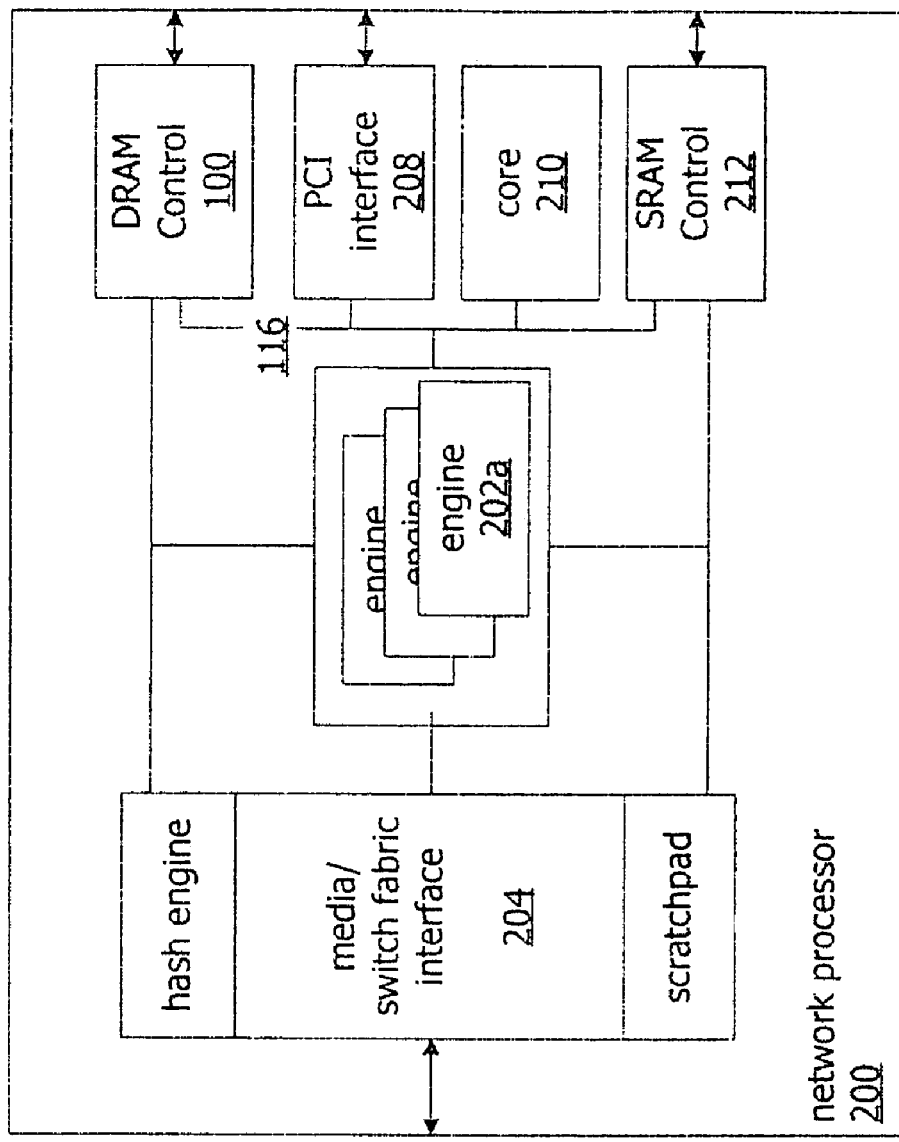
FIG. 5 is a diagram of a multi-engine processor.

The techniques described above may be implemented in a wide variety of devices. For example, FIG. 5 depicts an example of a network processor 200 including such a controller 100. The network processor 200 shown is an Intel® Internet eXchange network Processor (IXP). Other network processors feature different designs.

The network processor 200 shown features a collection of processing engines 202 on a single integrated semiconductor die. Each engine 202 may be a Reduced Instruction Set Computing (RISC) processor tailored for packet processing. For example, the engines 202 may not provide floating point or integer division instructions commonly provided by the instruction sets of general purpose processors. Individual engines 202 may provide multiple threads of execution. For example, an engine 202 may store multiple program counters and other context data for different threads. The network processor 200 also includes a "core" processor 210 (e.g., a StrongARM® XScale®) that is often programmed to perform "control plane" tasks involved in network operations. The core processor 210, however, may also handle "data plane" tasks.

As shown, the network processor 200 also features at least one interface 202 that can carry packets between the processor 200 and other network components. For example, the processor 200 can feature a switch fabric interface 202 (e.g., a Common Switch Interface (CSIX)) that enables the processor 200 to transmit a packet to other processor(s) or circuitry connected to the fabric. The processor 200 can also feature an interface 202 (e.g., a System Packet Interface (SPI) interface) that enables the processor 200 to communicate with physical layer (PHY) and/or link layer devices (e.g., MAC or framer devices). The processor 200 also includes an interface 208 (e.g., a Peripheral Component Interconnect (PCI) bus interface) for communicating, for example, with a host or other network processors.

As shown, the processor 200 also includes other components shared by the engines 202 such as a hash engine and internal scratchpad memory shared by the engines. Memory controllers 100, 212 provide access to external memory shared by the engines. As shown, memory controller 100 receives commands from the engines 202 and the core over bus 116.

Figure 6:
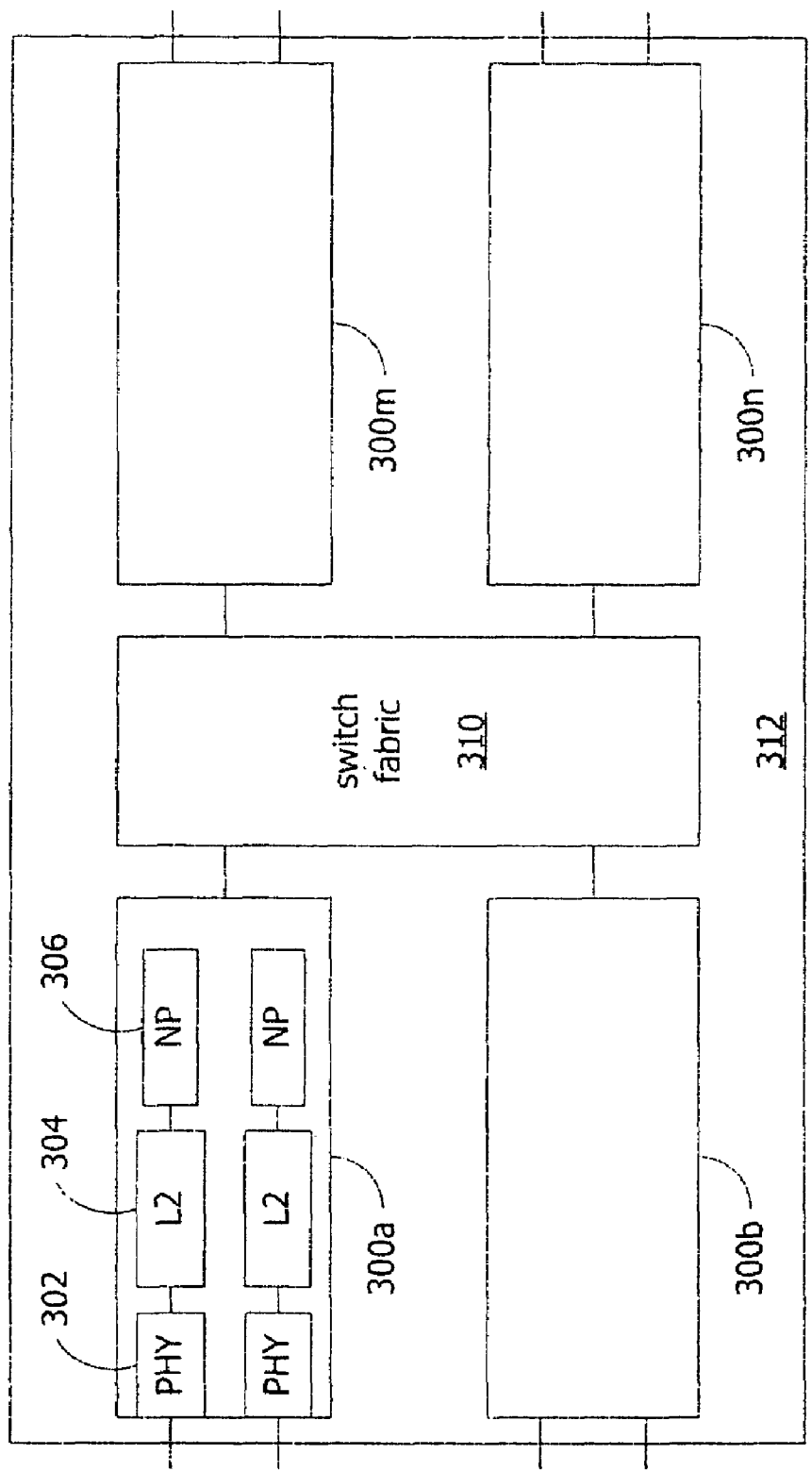
FIG. 6 is a diagram of a network forwarding device.

FIG. 6 depicts a network device that can process packets using a memory controller described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual line cards (e.g., 300a) may include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown may also include one or more network processors 306 that perform packet processing operations for packets received via the PHY(s) 302 and direct the packets, via the switch fabric 310, to a line card providing an egress interface to forward the packet. Potentially, the network processor(s) 306 may perform "layer 2" duties instead of the framer devices 304. As described above, the network processor(s) 306 may include one or more memory controllers 100 using techniques described above. Alternately, other components in the device 300 may include such a memory controller 100.

While FIGS. 5 and 6 described specific examples of a network processor and a device incorporating network processors, the techniques may be implemented in a variety of architectures including processors and devices having designs other than those shown. Additionally, the techniques may be used in a wide variety of network devices (e.g., a router, switch, bridge, hub, traffic generator, and so forth).

The term circuitry as used herein includes hardwired circuitry, digital circuitry, analog circuitry, programmable circuitry, and so forth. The programmable circuitry may operate on computer programs. For example, controller circuitry may be implemented by an Application Specific Integrated Circuit (ASIC) including logic for a finite state machine.

Other embodiments are within the scope of the following claims.

What is claimed is:

1. A method, comprising:
    accessing multiple memory access commands from a one of multiple memory access command queues associated with, respective, banks of a Random Access Memory (RAM), wherein each Random Access Memory bank is associated with a different respective one of the multiple memory access command queues and each of the multiple memory access command queues is associated with a different respective bank of the Random Access Memory;
    determining a type of an immediately previous selected memory access command, the type of the immediately previous selected memory access command being one of a memory read access and a memory write access; and
    selecting a one of the multiple memory access commands based, at least in part, on:
        the determined type of the immediately previous selected memory access command; and
        the respective types of the accessed multiple memory access commands, the respective types of the accessed multiple memory access commands being selected from the group of: a memory read access and a memory write access, at least one of the accessed multiple memory access commands being a memory read access type and at least one of the accessed multiple memory access commands being a memory write access type;
    wherein the selecting the one of the multiple memory access commands comprises selecting a memory access command requesting a write operation based on a determining that the type of the immediately previous issued memory access command was a memory read access; and
    wherein the multiple memory access commands are identified in multiple respective storage elements coupled to a multiplexer and wherein selecting comprises causing a multiplexer to select a one of the storage elements coupled to the multiplexer.

2. The method of claim 1, wherein the Random Access Memory comprises a Reduced Latency Dynamic Random Access Memory (RLDRAM) Separate I/O (SIO).

3. The method of claim 1,
    further comprising, comparing addresses indicated by the multiple memory access commands wherein the starting addresses indicated by the multiple memory access commands are different but the set of addresses identified by the multiple memory access commands overlap.

4. The method of claim 1, wherein the multiple memory access commands consist of two commands.

5. The method of claim 1, further comprising a round robin servicing of the queues.

6. A device, comprising:
    a bus interface;
    a Random Access Memory interface; and
    circuitry to:
        access multiple memory access commands from a one of multiple memory access command queues associated with, respective, banks of a Random Access Memory (RAM), wherein each Random Access Memory bank is associated with a different respective one of the multiple memory access command queues and each of the multiple memory access command queues is associated with a different respective bank of the Random Access Memory;
        determine a type of an immediately previous selected memory access command, the type of the immediately previous selected memory access command being one of a memory read access and a memory write access; and
        select a one of the multiple memory access commands based, at least in part, on:
            the determined type of the immediately previous selected memory access command; and
            the respective types of the accessed multiple memory access commands, the respective types of the accessed multiple memory access commands being selected from the group of: a memory read access and a memory write access, at least one of the accessed multiple memory access commands being a memory read access type and at least one of the accessed multiple memory access commands being a memory write access type,
    wherein the circuitry to select the one of the multiple memory access commands comprises circuitry to select a memory access command requesting a write operation based on a determining that the immediately previous selected memory access command was a memory read access; and
    wherein the multiple memory access commands are identified in multiple respective storage elements coupled to a multiplexer and wherein selecting comprises causing a multiplexer to select a one of the storage elements coupled to the multiplexer.

7. The device of claim 6, wherein the Random Access Memory comprises a Reduced Latency Dynamic Random Access Memory (RLDRAM) Separate I/O (SIO).

8. The device of claim 6, wherein the circuitry comprises circuitry to initiate a memory access operation based on the selected command.

9. The device of claim 6, wherein the circuitry further comprises circuitry to:
    compare addresses indicated by the multiple memory access commands wherein the starting addresses indicated by the multiple memory access commands are different but the set of addresses identified by the multiple memory access commands overlap.

10. The device of claim 6, wherein the multiple memory access commands consist of two commands.

11. The device of claim 6, wherein the bus interface comprises an interface to a bus shared by multiple programmable multi-threaded engines integrated on a single integrated die.

12. The device of claim 6,
wherein the storage elements identify the topmost memory access commands of the queue; and
wherein a different one of the storage elements stores the topmost memory access command of the queue at different times.

13. A processor, comprising:
multiple programmable multi-threaded engines integrated within a single die; and
a bus coupled to at least some of the engines;
a memory controller coupled to the bus, the memory controller comprising:
a Random Access Memory interface; and
circuitry to:
access multiple memory access commands from a one of multiple memory access command queues associated with, respective, banks of a Random Access Memory (RAM), wherein each Random Access Memory bank is associated with a different respective one of the multiple memory access command queues and each of the multiple memory access command queues is associated with a different respective bank of the Random Access Memory;
determine a type of an immediately previous selected memory access command, the type of the immediately previous selected memory access command being one of a memory read access and a memory write access; and
select a one of the multiple memory access commands based, at least in part, on:
the determined type of the immediately previous selected memory access command; and
the respective types of the accessed multiple memory access commands, the respective types of the accessed multiple memory access commands being selected from the group of: a memory read access and a memory write access, at least one of the accessed multiple memory access commands being a memory read access type and at least one of the accessed multiple memory access commands being a memory write access type;
wherein the circuitry to select the one of the multiple memory access commands comprises circuitry to select a memory access command requesting a write operation based on a determination that the type of the immediately previous selected memory access command was a memory read access; and
wherein the multiple memory access commands are identified in multiple respective storage elements coupled to a multiplexer and wherein selecting comprises causing a multiplexer to select a one of the storage elements coupled to the multiplexer.

14. The processor of claim 13, wherein the circuitry further comprises circuitry to:
compare addresses indicated by of the multiple memory access commands wherein the starting addresses indicated by the multiple memory access commands are different but the set of addresses identified by the multiple memory access commands overlap.

15. The processor of claim 13, wherein the multiple memory access commands consist of two commands.

16. The processor of claim 13, further comprising at least one selected from the group of: a switch fabric interface and an interface to a media access control device.

* * * * *